United States Patent [19]

Sandera et al.

[11] 4,017,665

[45] Apr. 12, 1977

[54] COMPOSITION FOR A ZINC ELECTRODE

[75] Inventors: Josef Sandera; Milan Calabek; Oldrich Kouril; Miroslav Cenek, all of Brno; Josef Vanacek, Slapanice; Jiri Malik; Vojtech Koudelka, both of Mlada Boleslav, all of Czechoslovakia

[73] Assignee: Prazska akumulatorka, narodni podnik, Mlada Boleslav, Czechoslovakia

[22] Filed: May 21, 1975

[21] Appl. No.: 579,701

[30] Foreign Application Priority Data

May 21, 1974 Czechoslovakia .............. 3620/74

[52] U.S. Cl. .............................................. 429/229
[51] Int. Cl.² ....................................... H01M 35/02
[58] Field of Search .............................. 136/30–31, 136/125–127, 120 R, 68, 63, 19, 20, 75, 95, 102; 429/229

[56] References Cited

UNITED STATES PATENTS

| | | | |
|---|---|---|---|
| 2,738,375 | 3/1956 | Schlotter | 136/30 |
| 3,592,693 | 7/1971 | Rosansky | 136/30 X |
| 3,645,793 | 2/1972 | Hein et al. | 136/30 X |
| 3,713,891 | 1/1973 | Curelop et al. | 136/30 |

*Primary Examiner*—Anthony Skapars

[57] ABSTRACT

An improved active electrode composition for a zinc electrode of an electrochemical accumulator is provided with an ingredient that inhibits the passage of zinc into the alkaline electrolyte of the accumulator during the discharge process. The ingredient is preferably an alkaline fluoride, which during discharge forms with the zinc a compound which is only slightly soluble, if at all, in the electrolyte. The resulting prevention of the reversible movement of zinc into and out of the solution is effective to prevent an undesired shifting of active material on the collector of the electrode, and generally to increase its life.

5 Claims, No Drawings

COMPOSITION FOR A ZINC ELECTRODE

BACKGROUND OF THE INVENTION

This invention relates to compositions for a zinc electrode suitable for use, e.g. in an accumulator of the nickel-zinc, silver-zinc or zinc-air type having an alkaline electrolyte.

A common drawback of existing zinc electrodes for such applications is their low life time, caused principally by the behavior of the composition of the electrode in the alkaline electrolyte. Such behavior involves the changes of concentration of hydroxyl and zincate ions in the electrolyte during charge and discharge, via the following equation:

Thus, during the discharging process, soluble zinc compounds are produced in the electrolyte, while during charging zinc is redeposited on the electrode collector. Unfortunately, the redeposition does not take place on those portions of the electrode from which the zinc entered the solution. This leads to an undesirable shifting of the active material on the collector, as well as to the formation of dendrites and to an accelerated consumption of the electrode.

While certain techniques exist to reduce these effects (e.g. electrolyte selection, addition of separators, etc.), their efficacy for the intended purpose is relatively limited.

SUMMARY OF THE INVENTION

The above-noted undesirable transfer of zinc into the electrolyte solution during discharge is greatly minimized by the improved zinc electrode composition in accordance with the invention.

In particular, a powder of zinc or a zinc compound is mixed with an alkaline fluoride or other suitable composition which is capable of forming, with zinc liberated during the discharge process, a nearly insoluble compound, thereby inhibiting the transfer of free zinc into the electrolyte.

Preferably, such added alkaline substance is sodium fluoride, potassium fluoride or their compounds. In any case, the total percentage by weight of the alkaline fluoride in the composition should be in the range of 5-55%.

In order to accomplish the desired result of inhibiting the flow of zinc into the alkaline electrolyte, other substances than the alkaline fluorides may be used. For example, compounds of boron or carbon, particularly sodium borate, sodium carbonate, sodium acetate or their mixtures, can be used.

DESCRIPTION OF IMPROVED COMPOSITION

The improved electrode composition of the invention includes (a) powdered zinc or a powdered compound of zinc, (b) a binding agent, (c) a porosity-increasing agent, and (d) an ingredient that forms a negligibly soluble solution with zinc, such as sodium fluoride, potassium fluoride, sodium borate, sodium carbonate, sodium acetate or their mixtures. The latter ingredient is present in a range of 5-55% by weight of the composition.

The improved composition is applied in a conventional manner to the electrode collector, and is exposed to a conventional heat treatment. The inhibiting effect of the resulting composition is found to be effective to (1) limit the sedimentation of zinc in the accumulator tank, (2) prevent the formation of undesired dendrites, and (3) prevent the shifting of the active composition of the electrode during the charge and discharge processes, thereby increasing its efficiency of utilization. Additionally, the incorporation of the improved composition in the electrode substantially reduces the stringency of control during the charging process.

The following illustrative examples of the composition of the invention are herewith presented without limiting the generality of the foregoing:

A plurality of zinc electrode compositions were formulated which included (1) zinc powder, (2) dispersion employed as a binding agent, (3) oxalic acid powder employed as a porosity-increasing agent, and (4) various types of alkaline fluorides, and the remainder water and a teflon dispersion employed as a binding agent. Several alkaline fluorides were employed, specifically sodium fluoride, potassium fluoride and their mixtures.

Each of the resulting composition was applied to a collector of the electrode to be manufactured, illustratively.

It was found that all of the so-constructed zinc electrodes formed using any of the compositions within the ranges specified in these examples performed at at least 60% of their theoretical capacity after the 50th charging cycle of the accumulator, and performed at 30% of their theoretical capacity at the end of 200 charging cycles. Even after the attainment of the 200th cycle, no significant dendrite or sedimentation formation was observed.

What is claimed is:

1. An improved composition for a zinc electrode, consisting of (a) a powdered material selected from the group consisting of zinc and zinc compounds, (b) a binding agent, (c) a porosity-increasing agent, and (d) a substance selected from the group consisting of sodium fluoride, potassium fluoride, and their mixtures, the substance being present in the composition in the range of 5-55% by weight.

2. A composition as defined in claim 1, in which the powdered material is zinc.

3. A composition as defined in claim 1, in which said substance is sodium fluoride.

4. A composition as defined in claim 1, in which said substance is potassium fluoride.

5. An improved composition for a zinc electrode, consisting of (a) powdered zinc, (b) a binding agent, (c) a porosity-increasing agent, and (d) an alkaline fluoride, the alkaline fluoride being present in the composition in the range of 5-55% by weight.

* * * * *